United States Patent [19]

Komori et al.

[11] Patent Number: 4,980,851

[45] Date of Patent: Dec. 25, 1990

[54] REDUCED POWER PIPELINED STATIC DATA TRANSFER APPARATUS

[75] Inventors: Shinji Komori; Hidehiro Takata; Toshiyuki Tamura; Fumiyasu Asai, all of Itami; Tetsuo Yamasaki; Kenji Shima, both of Amagasaki, all of Japan

[73] Assignee: Mitsubishi Denki Kabushiki Kaisha, Tokyo, Japan

[21] Appl. No.: 284,963

[22] Filed: Dec. 15, 1988

[30] Foreign Application Priority Data

Jul. 21, 1988 [JP] Japan ........................... 63-182107

[51] Int. Cl.$^5$ ............................................ G06F 13/00
[52] U.S. Cl. .............................. 364/900; 364/948.34; 364/940.81; 364/948.4; 364/948.8
[58] Field of Search ............................. 364/200, 900

[56] References Cited

U.S. PATENT DOCUMENTS 4,387,294  6/1983  Nakamura et al. ............. 364/900 X

OTHER PUBLICATIONS

"Introduction to VLSI Systems", Mead and Conway, 1980, Addison-Wesley Publishing Company, pp. 254-263.

Primary Examiner—Raulfe B. Zache
Attorney, Agent, or Firm—Townsend and Townsend

[57] ABSTRACT

A pipelined processor is provided with a plurality of control stages controlling a datapath made up of a plurality of parallel static-type data latches. The latches each include a feedback circuit, typically a field-effect transistor, which is enabled by a data latch control signal from a particular control stage. Enabling the feedback stage consumes power. A data stagnation detection circuit detects a data stagnation in the datapath, by use of handshake control signals exchanged between the control stages. The data stagnation detection circuit inhibits enablement of the feedback circuit when no data stagnation is detected, reducing power used in the latch.

13 Claims, 11 Drawing Sheets

REDUCED POWER PIPELINED STATIC DATA TRANSFER APPARATUS

BACKGROUND OF THE INVENTION

1. Field of the Invention

This invention relates to a data transfer apparatus, more specifically to the data transfer apparatus transferring asynchronously parallel data by handshake system and a pipeline processing apparatus using the data transfer apparatus and in more detail to the data transfer apparatus using static latches to hold data and the pipeline processing apparatus using the data transfer apparatus.

2. Description of the Prior Art

The inventors of this invention have previously proposed a data transfer control circuit in U.S. patent application No. 07/157,194. At first, with reference to FIG. 1 through FIG. 3, first this invention will be described.

FIG. 1 is a block diagram showing the schematic configuration of a pipeline processing apparatus having two-stage configuration as an example.

The pipeline processing apparatus is configured by series-connected handshake transfer control circuits 811, 812 and 813 and by series-connected parallel data latches 821, 822 and 823 with combinational logic circuits 831 and 832 provided between the latches.

Also, each of the combinational logic circuits 831 and 832 is configured by a decode unit and logic unit.

Such pipeline processing apparatus is operated as follows:

When the handshake transfer control circuit 811 is ready to accept data, it outputs an acknowledge signal (hereafter called Ack signal) A1. And, when the pulse "1" of Send signal (data transfer request signal) S1 is inputted into the handshake transfer control circuit 811 controlling the parallel data latch 821 with the input data to the latch defined, the data is latched in the parallel data latch 821 and outputted into the combinational logic circuit 831. Then, data is processed by the combinational logic circuit 831 to define the input data to the parallel data latch 822, and when Ack signal A2 from the handshake transfer control circuit 812 is inputted into the handshake transfer control circuit 811, the handshake transfer control circuit 811 sends the pulse "1" of Send signal S2 to the handshake transfer control circuit 812. Thereafter, in similar manner, the data pulse of Send signal is propagated sequentially as S1, S2, S3 and S4 through the handshake transfer control circuits 811, 812 and 813 according to the return of Ack signal. Following the pulse propagation, the open/close operation of the parallel data latches 821, 822 and 823 is sequentially controlled, causing the input data to be transferred sequentially between the parallel data latches 821, 822 and 823.

Now, the input data is assumed to consist of a pair of an operation code portion indicating the kind of operation and a data portion being the object of operation. Of the input data, the operation code portion is decoded at the decode unit of the combinational logic circuit 831 (832). According to that result, the processing content for the data portion, such as addition or subtraction, is determined to be processed at the logic unit.

Thus, with the input data passed through the pipeline processing apparatus, various complex processing can be executed as a whole.

However, in each stage of pipeline processing, in the case where the next stage is occupied with the preceding data, that is, the data is stagnated, the following data is stopped at the stage previous to the next stage. For example, in the case where the preceding data is stagnated at the stage between the parallel data latches 822 and 823, the Ack signal A3 from the handshake transfer control circuit 813 is converted to "1" in order to transfer the following data from the parallel data latch 822 to the latch 823, with the result that Send signal S3 sent from the handshake transfer control circuit 812 to the circuit 813 is kept at the state holding "1". This causes the following data to be sequentially stopped thereafter.

Even when the data transfer is stopped as above, the data is required to be positively held at each parallel data latch 821, 822 and 823, so that the circuit for 1 bit of each parallel data latch 821, 822 and 823 consists of the static latch as shown in FIG. 2 with the reference symbol 11 (12). However, FIG. 2 shows a simple data transfer apparatus omitting the combinational logic circuit which executes data processing.

In FIG. 2, the reference numerals 11 and 12 are logic circuit diagrams each of which shows a data latch circuit having 40-bits width (equivalent to the 821, 822 or 823 in FIG. 1), with 40 sets of a latch circuit 110 (120) for 1 bit being located in parallel. The latch circuit 110 (120) consists of inverter buffers 111, 112 and 113 (121, 122 and 123) and transfer gates 114 and 115 (124 and 125).

The reference numerals 13 and 14 are the handshake transfer control circuits (equivalent to the 811, 812 or 813 in FIG. 1) of the above mentioned data latch circuits 11 and 23 respectively, each of which consists of an R-S flip-flop 15 (17) as the first memory means, an R-S flip-flop 16 (18) as the second memory means, a 4-input NAND gate 131 (141) as a data transfer request signal receiving circuit, inverter buffers 134, 135 and 139 (144, 145 and 149) and a 2-input NAND gate 138 (148).

In addition, the first R-S flip-flop 15 (17) consists of 2-input NAND gates 132 and 133 (142 and 143), and the second R-S flip-flop 16 (18) consists of 2-input NAND gates 136 and 137 (146 and 147).

More specifically, the pulse S1 (S2) of Send signal (data transfer request signal) from the proceeding stage is sent to the one input of the 4-input NAND gate 131 (141) in the control circuit 13 (14), and the output of the 4-input NAND gate 131 (141) is connected to the set terminal S of the first R-S flip-flop 15 (17). And, the reset terminal R of the first R-S flip-flop 15 (17) receives an acknowledge signal $\overline{A2}$ ($\overline{A3}$) from the control circuit in the next stage. The acknowledge signal $\overline{A2}$ ($\overline{A3}$) is also sent to the one input of the 4-input NAND gate 131 (141).

The signal from the output terminal Q of the R-S flip-flop 15 (17) is sent as the inversion signal $\overline{S2}$ ($\overline{S3}$) of Send signal pulse S2 (S3) through the inverter buffer 134 (144) to the transfer gate 114 (124) in the data latch circuit 1 (12), and to the one input of the 4-input NAND gate 141 in the control circuit 14 of the next stage. And, the signal from the inversion output terminal $\overline{Q}$ of the second R-S flip-flop 16 (18) is sent through the inverter buffer 135 (145) to the transfer gate 115 (125) in the data latch circuit 11 (12), and to the one input of its own 4-input NAND gate 131 (141).

Send signal pulse S1 (S2) from the preceding stage is also sent to the reset terminal R of the second R-S flip-flop 16 (18), and the output of the 4-input NAND gate 131 (141) is also sent to the set terminal S of the second R-S flip-flop 16 (18). And, the signal from the inversion output terminal $\bar{Q}$ of the second R-S flip-flop 16 (18) is sent to one input of the NAND gate 138 (148) whose other input receives a reset signal RESET. The output of the NAND gate 138 (148) is sent as an acknowledge signal $\overline{A1}$ ($\overline{A2}$) through the inverter buffer 139 (149) to the preceding stage and to the last one input of its own 4-input NAND gate 131 (141).

Actual configuration of a data transfer circuit is such that plural combinations of such data latch circuit 11 (12) and control circuit 13 (14) are connected in cascade.

A conventional transfer circuit having a configuration mentioned above is operated as follows:

When in an initial state the reset signal RESET converts to "1", entire signal lines are directly initialized.

When Send signal pulse S1 is inputted into the data transfer control circuit 13, the data transfer control circuit makes the flip-flop 15 consisting of NAND gates 132 and 133 to set state. This causes Send signal S2 to be converted to "1" and its inversion output $\overline{S2}$ to be converted to "0", so that the data latch circuit 11 controlled by the data transfer control circuit 13 is made to latch state (input change forbidden state) to define the latch output. At the same time, Send signal S2 to the data transfer control circuit 14 in the next stage converts to active state "1", so that all four inputs of the 4-input NAND gate 141 in the next stage convert to "1". This causes both the R-S flip-flop 17 consisting of NAND gates 142 and 143 and the R-S flip-flop 18 consisting of NAND gates 146 and 147 to be set, and the acknowledge signal A2 converts to non-active state "0".

The change of the acknowledge signal $\overline{A2}$ to active state causes the flip-flop 15 in the data transfer control circuit 13 to be reset, and Send signal S2 converts to non-active state "0".

At this point, even if Send signal S1 is still active state "1", the flip-flop 16 still holds set state so that the output of the inverter 139 is "0" and all inputs of the 4-input NAND gate 131 are not "1". Therefore, the flip-flop 15 is not set once again, so that no extra Send signal S2 is generated.

Thereafter, once Send signal S1 converts to non-active state "0", at that point the flip-flop 16 is reset, and the output of the inverter 139 converts to "1". Therefore, when, at this point or thereafter, Send signal S1 converts to active state once again, all inputs of the 4-input NAND gate 131 convert to "1", causing the flip-flops 15 and 16 to be set and new Send signal pulse S2 to be generated.

The series of operation mentioned above is shown in FIG. 3 of timing chart.

Referring to FIG. 3, it will be seen that, at the time u, H1 and $\overline{A2}$ among inputs S1, H1, $\overline{A1}$ and $\overline{A2}$ of the 4-input NAND gate 131 return to "1", but $\overline{A1}$ keeps "0", so that the generation of a new M1 pulse is suppressed.

The signal $\overline{A1}$ returns to "1" in response to the change of Send signal S1 to non-active state "0", so that, at the time v when Send signal pulse S1 corresponding to WORD 2 is inputted, all inputs S1, H1, $\overline{A1}$ and $\overline{A2}$ of the 4-input NAND gate go to "1". Therefore, a normal M2 pulse in response to WORD 2 is generated.

As apparent by the above description, referring to FIG. 2, at the time when the handshake transfer control circuit 13 receives Send Signal S1 and generates Send signal S2 to the next stage, the circuit turns off the transfer gate 114 and on the transfer gate 115, keeping the input data value at the node N1 in the latch circuit 110. Since the above mentioned state is kept while Send signal S2 keeps "1", the latch circuit consisting of the inventors 112 and 113 is operated to hold the signal level of the node N1 static state.

On the other hand, in response to the receiving of Ack signal $\overline{A2}$ from the next stage, the level of Send signal S converts to "0", so that the transfer gate 114 is turned on and the transfer gate 115 is off. This caused the condition of the path from input to output side in the date latch circuit to become transparent, making the acceptance of succeeding data possible.

Now, conventional data transfer apparatus as mentioned above requires the charge and discharge of the gate electrode in the transfer gates 114 (124) and 115 (125) for each pass of one data. Therefore, such a problem occurs that the wider the bit of the data to be transferred the larger the power consumption, together with increased calorific value.

SUMMARY OF THE INVENTION

This invention has been made in consideration of such circumstance. It is accordingly the prime object of this invention to provide a data transfer apparatus capable if reducing the power consumed in handshake transferring parallel data between adjacent stages.

It is the second object of this invention to provide a pipeline processing apparatus utilizing such a data transfer apparatus as mentioned above.

The data transfer apparatus and pipe line processing apparatus according to this invention are provided with a means for detecting the data stagnation on a data transfer path and with a means for allowing or forbidding the charge and discharge of the gate electrode of the transfer gate on the feedback side of static type data latch circuits in each stage according to the detected result by the means for detecting data stagnation.

More specifically considering the fact that a data stagnation due to the clogging in the final output part of a data transfer path requires the data holding by a static type data latch, this invention employs such a configuration that in the case where the means for detecting data stagnation detects a data stagnation, the charge and discharge of the gate electrode of the transfer gate on the feedback side of data latches in each stage is allowed, and in the case where no data stagnation is detected, the charge and discharge of the gate electrode of the transfer gate on the feedback side of data latches in each stage is forbidden, providing off state at all times. This forbids the charge and discharge of the gate electrode of the transfer gate on the feedback side of data latches in each stage in the case where no data stagnation occurs on the data transfer path, so that the power consumption is reduced and calorific value decreases accordingly.

The above and further objects and features of the invention will more fully be apparent from the following detailed description with accompanying drawings.

DESCRIPTION OF THE PREFERRED EMBODIMENTS

Figure 1:
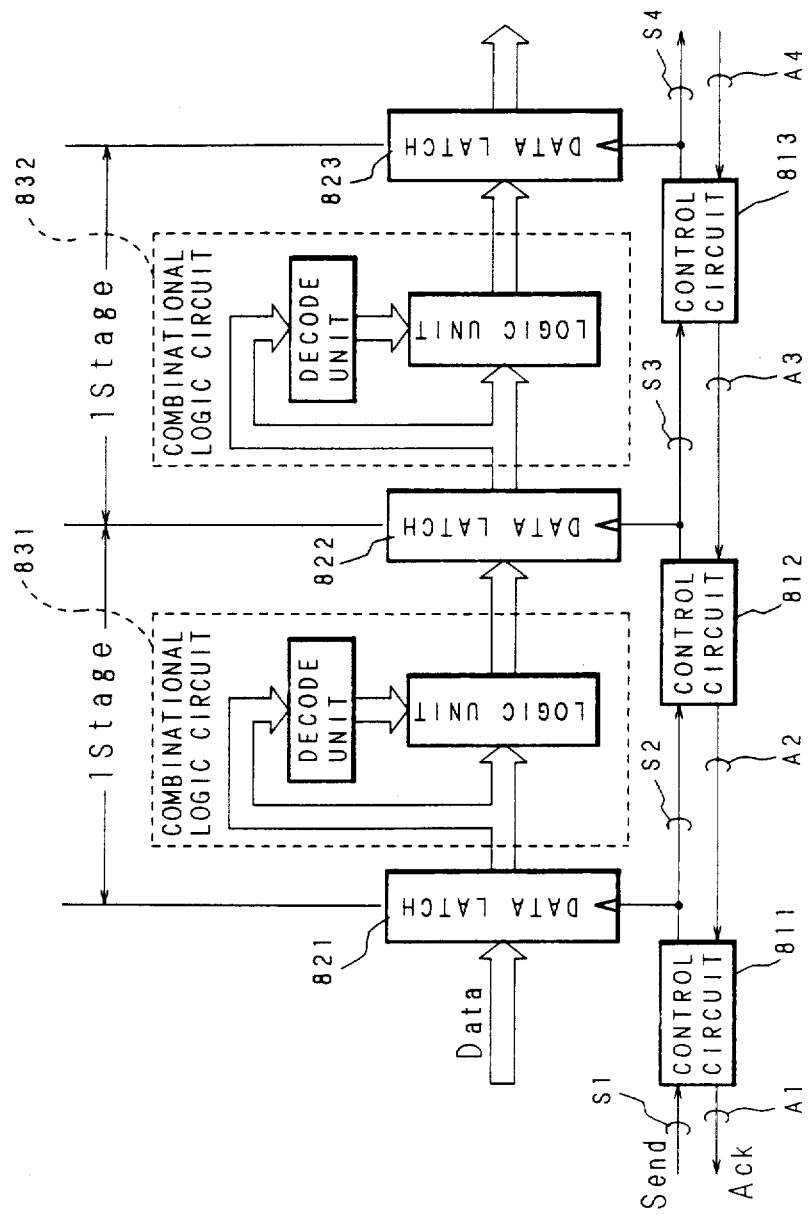
FIG. 1 is a block diagram showing the schematic configuration of a conventional pipeline processing apparatus.

This invention will hereafter be described referring to the drawings showing its embodiments.

Figure 4:
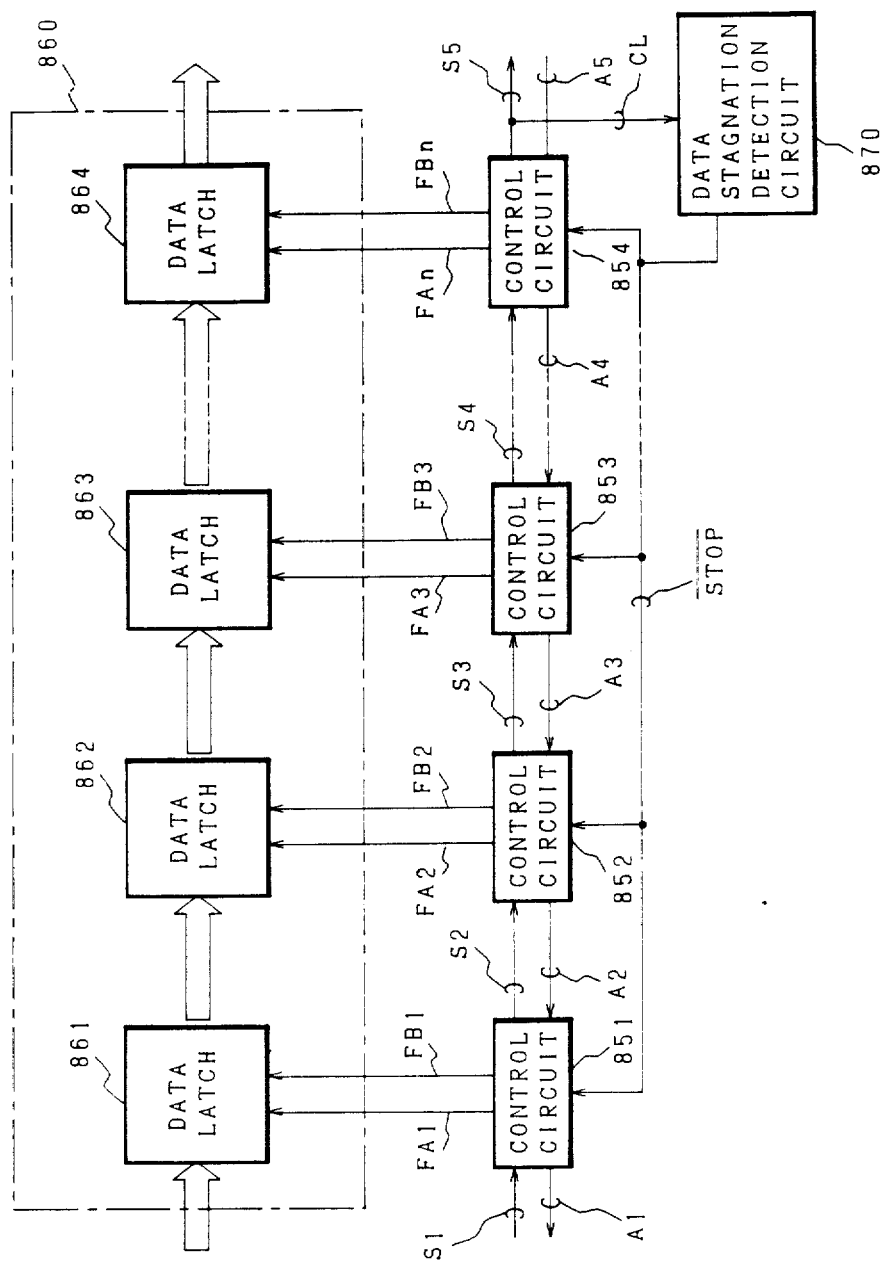
FIG. 4 is a block diagram showing the schematic configuration of a data transfer apparatus according to this invention.

FIG. 4 is a block diagram showing a schematic configuration example of a data transfer apparatus according to this invention.

In the figure, a reference numeral 860 designates a data transfer path which is configured by connecting on series static type parallel data latches 861 through 864.

851 through 854 designated data transfer control circuits which have control input terminals for fixing at "0" the level of input signal FB2 to the gate electrode of the transfer gate on the feedback side of static type parallel data latches 861 through 864.

870 designates a data stagnation detection circuit which receives Send signal (data transfer request signal) S5 outputted from the data transfer control circuit 854 in the final stage of the data transfer path as a signal CL, and converts its output signal $\overline{STOP}$ from "1" to "0" in the case where the signal CL is kept at "1" for a specified time.

Figure 2:
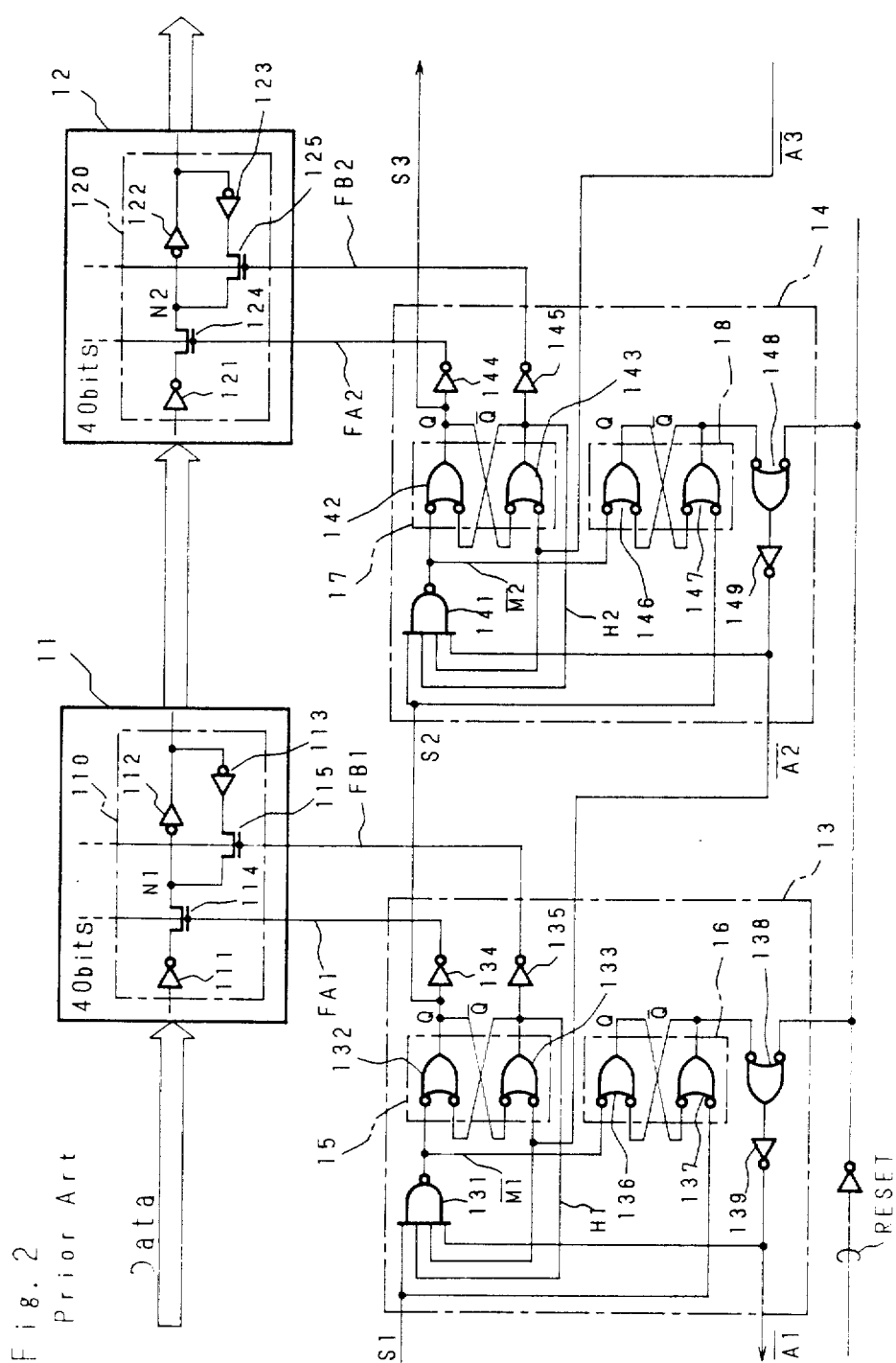
FIG. 2 is a concrete circuit diagram showing configuration of a logic circuit thereof.
Figure 5:
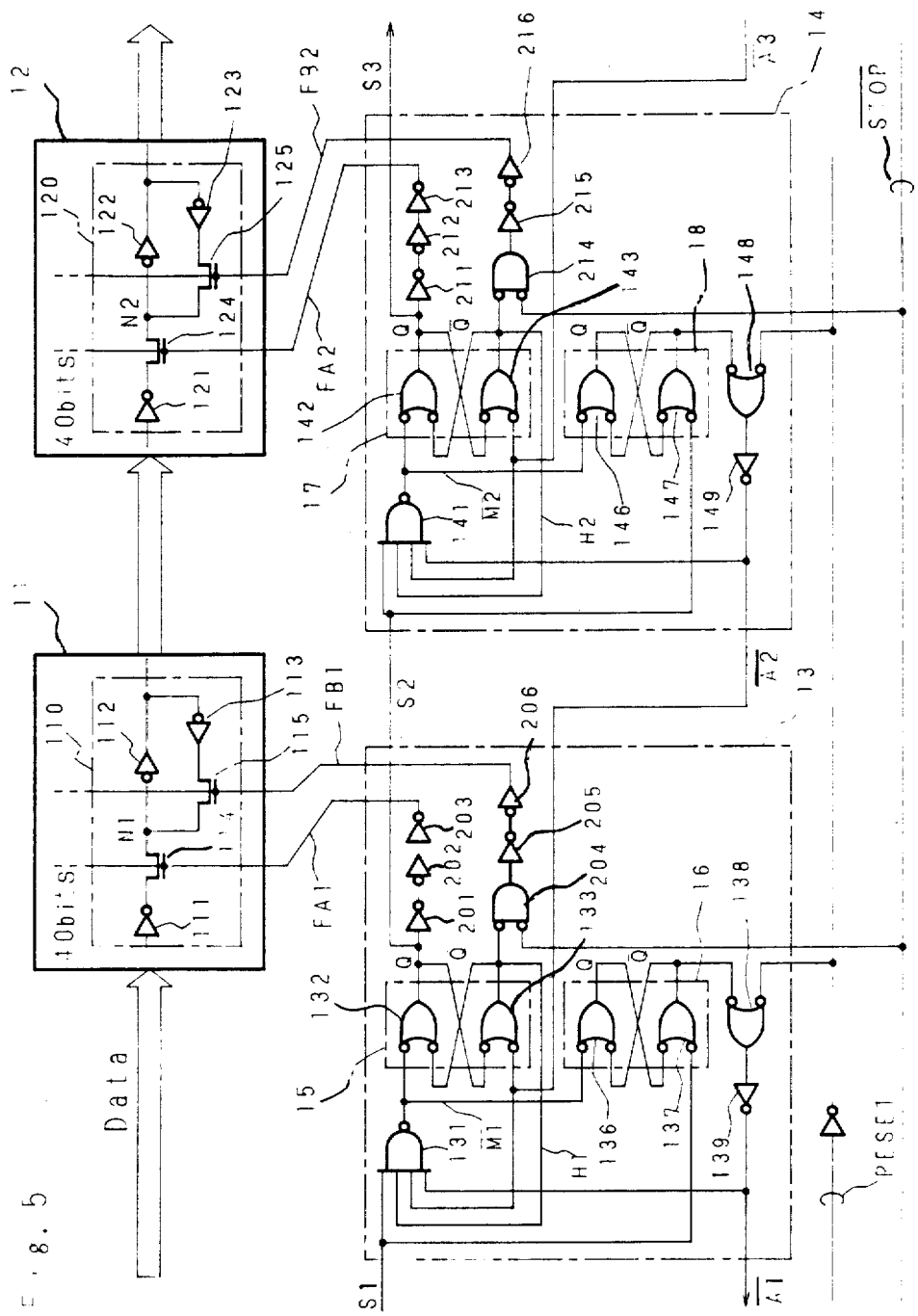
FIG. 5 is a concrete circuit diagram showing configuration of a logic circuit of two transfer stages according to this invention.

FIG. 5 is a circuit diagram showing the logic circuit configuration for two stages of the above mentioned data transfer apparatus. The circuit diagram in FIG. 5 is similar to configuration to that in FIG. 2 showing a conventional example other than the configuration that the circuit in FIG. 5 is additionally provided with circuits 201, 202 and 203 (211, 212 and 213) and 204, 205 and 206 (214, 215 and 216) for generating signals FA1 (FA2) and FB1 (FB2) for controlling the open/close operation (transparent/latch switching) of the parallel data latch having 40-bit width.

Since the data transfer apparatus having such a configuration according to this invention is quite similar in handshake transfer control to conventional apparatus, a detailed description of its operation will be omitted.

The data transfer control of the data transfer apparatus according to this invention differs from that of conventional apparatus in that, in the case where the input signal $\overline{STOP}$ to a 2-input NOR gate 204 (214) is "1", that is, no stagnation of parallel data being transferred is detected, the signal FB1 (FB2) is kept at "0" at all times and no charge and discharge of the gate electrode in a transfer gate 115 (125) being an N channel MOS transistor is performed. On the other hand, in the case where the input signal $\overline{STOP}$ to the 2-input NOR gate 204 (214) is "0", that is, a stagnation of parallel data being transferred is detected, the inversion signal of $\overline{Q}$ output from an R-S flip-flop 133 (143) is sent to the gate electrode of the transfer gate 115 (125) being an N channel MOS transistor.

If data is stagnated in a stage, the invention signal of $\overline{Q}$ output form the R-S flip-flop 133 (143) goes to "0", so that the signal "1" is sent to the gate electrode of the transistor 115 (125). This causes the transfer gate 115 (125) being an N channel MOS transistor on the feedback side, of the data latch circuit 11 (12) to be turned on, and the transfer gate 114 (124) being an N channel MOS transistor on the input side to become off state, with the result that the level of the data inputted previously is kept static by the parallel latch circuits.

The configuration and operation of a data stagnation detection unit will hereafter be described.

Figure 6:
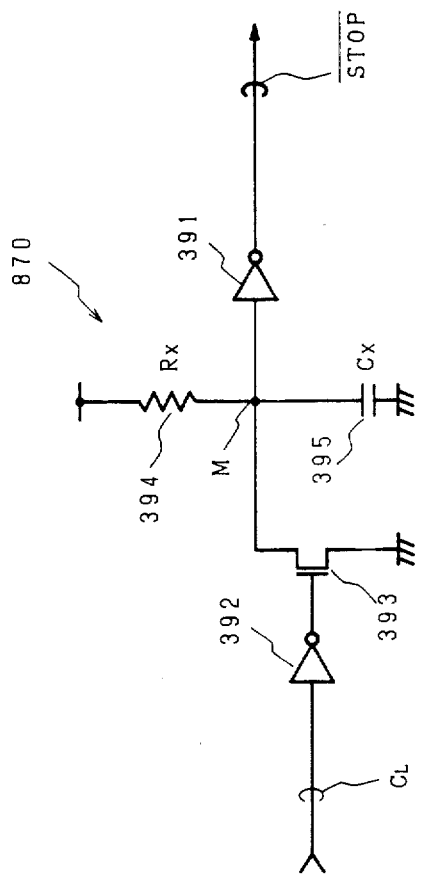
FIG. 6 is a logic circuit diagram showing the configuration of a data stagnation detection circuit.

FIG. 6 is a circuit diagram showing a configuration example of a data stagnation detection circuit 870.

The data stagnation detection circuit 870 consists of a resistor (Rx) 394 and a capacitor (Cx) 395 connected in series between power-supply potential and ground potential, of an N channel transistor 393 which is provided between a node M, between the resistor 394 and the capacitor 395, and a ground potential, and to whose gate the signal CL is inputted through an inverter buffer 392, and of an inverter buffer 391 to which a potential of the node M is inputted and from which the potential is outputted as a signal $\overline{STOP}$.

Figure 3:
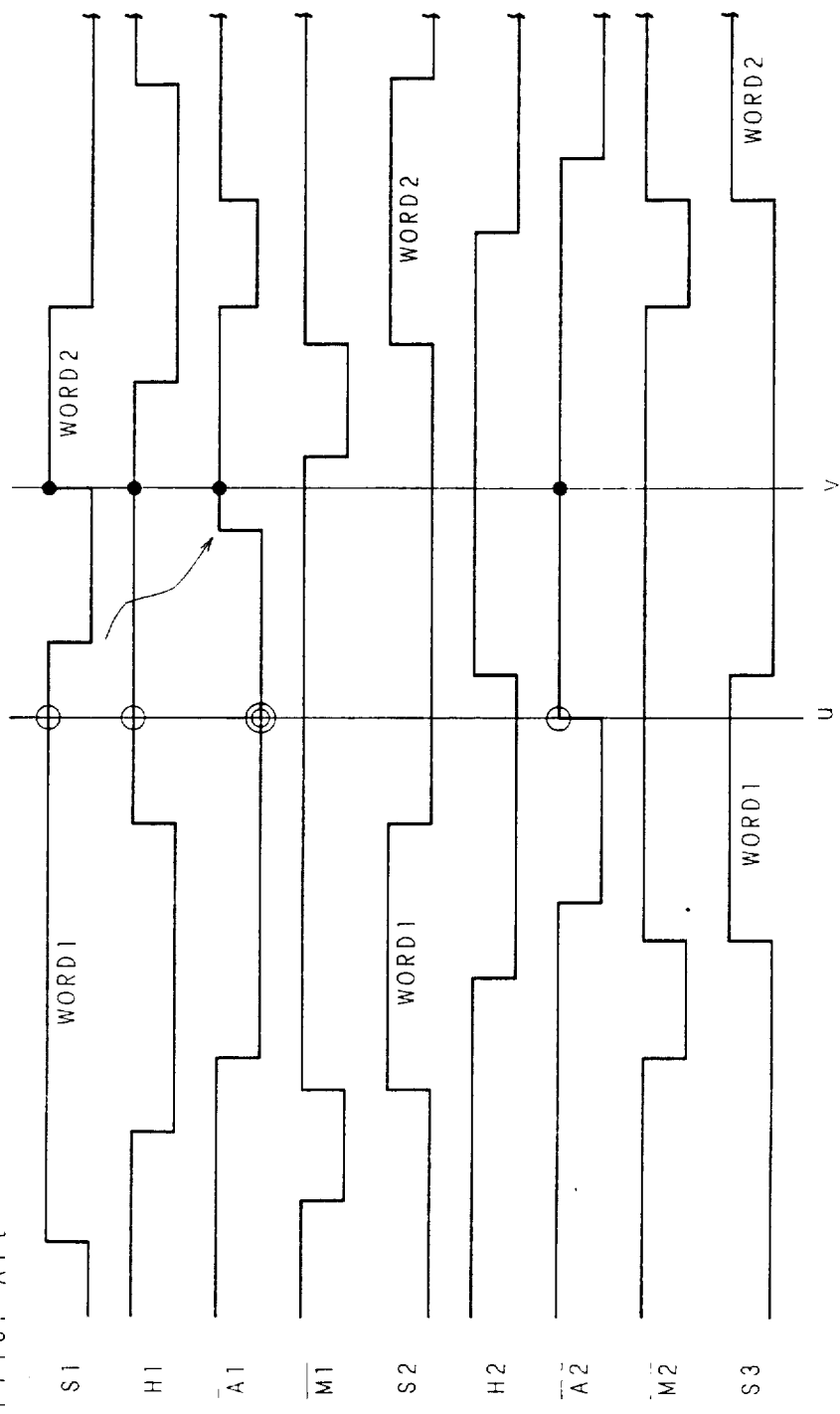
FIG. 3 is a timing chart showing its operating state.

In the apparatus according to this invention, data is controlled in respect to the data transfer by the handshake between adjacent stages, so that the next stage has a free space. This means that, as far as the free space has not been occupied with the preceding data, data is sequentially transferred. On the contrary, whenever data is stagnated, the final stage becomes clogged. Therefore, the input signal CL to the data stagnation detection circuit 870, which is Send signal from the data transfer control circuit 854 in the final stage, is kept at "1".

Where data is satisfactorily transferred, the signal CL also repeats "1" and "0" similarly to Send signal S2 in the timing chart shown in FIG. 3.

Therefore, in the circuit diagram of the data stagnation detection circuit 870 shown in FIG. 6, in the case where the channel width of the N channel transistor 393 is sufficiently large and the time constant of the RC circuit consisting of the resistor Rx 394 and the capacitor Cx 395 is sufficiently large, the potential of the node M at the interval "0" of the signal CL rapidly decreases to 0 V. However, since the time constant is large at the interval "1" of the signal CL, the potential of the node M does not increase to the input threshold potential of the inverter 391 even when a fairly long time has elapsed. This causes the output signal $\overline{STOP}$ of the data stagnation detection circuit 870 to be kept at "1" at all times.

On the other hand, in the case where the interval "1" of the signal CL has continued for a fairly long time, the N channel transistor 393 becomes off, so that the potential of the mode M increases gradually and finally exceeds the input threshold potential of the inverter 391. This causes the output signal $\overline{STOP}$ of the data stagnation detection circuit 870 to be converted to "0" and kept at "0" as long as data stagnation continues.

Figure 7:
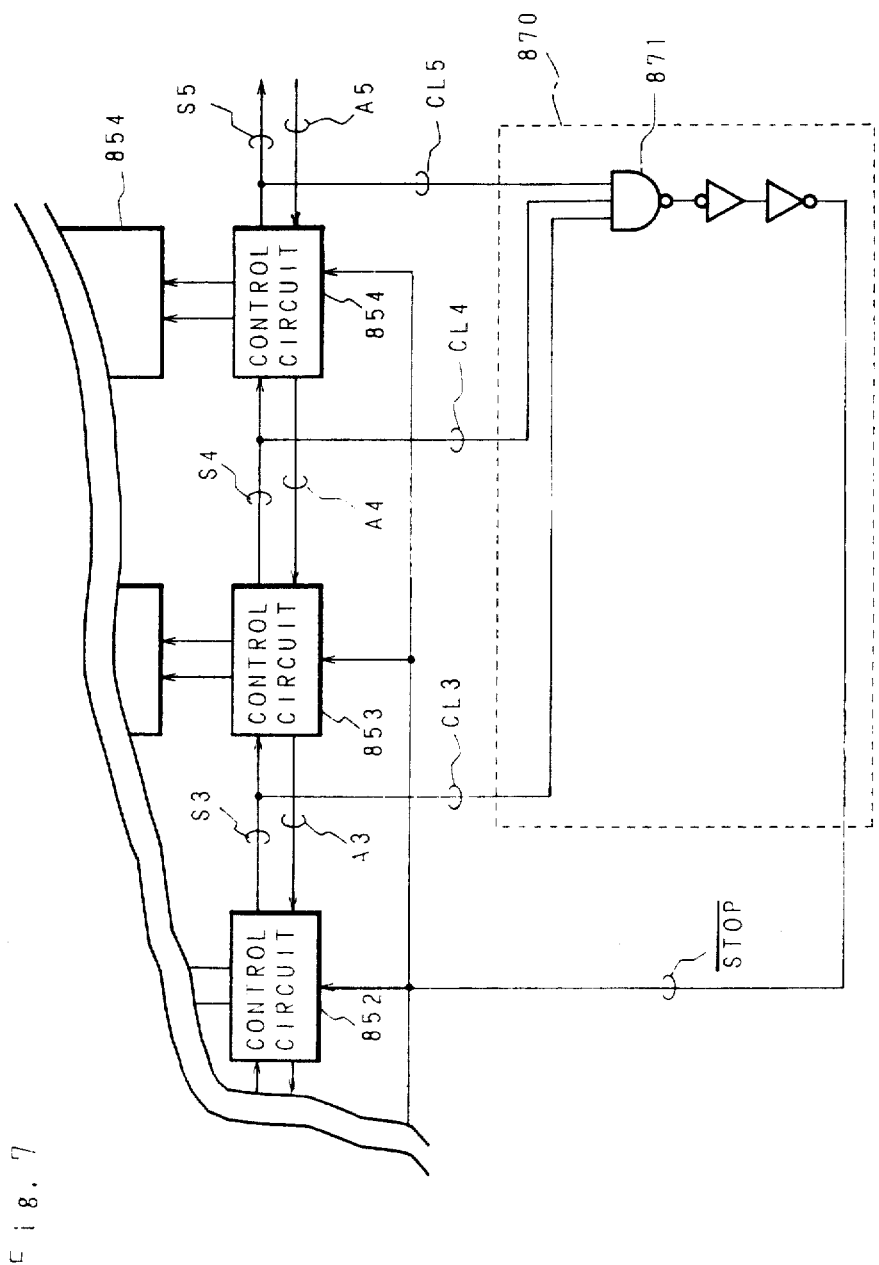
FIG. 7 is a circuit diagram showing another configuration example of the data stagnation detection circuit.

Although in the above mentioned embodiments, the data stagnation detection circuit 870 consists of RC circuits, if utilizing the characteristics that "Send signal of a handshake data transfer control circuit is kept at "1" when data is stagnated", the data stagnation detection circuit 870 can employ, for example, such a configuration as shown in FIG. 7.

This means that the AND signal of Send signals from the data transfer control circuits 851 through 854 can be obtained by an AND circuit 871 to generate the signal $\overline{STOP}$.

Figure 8:
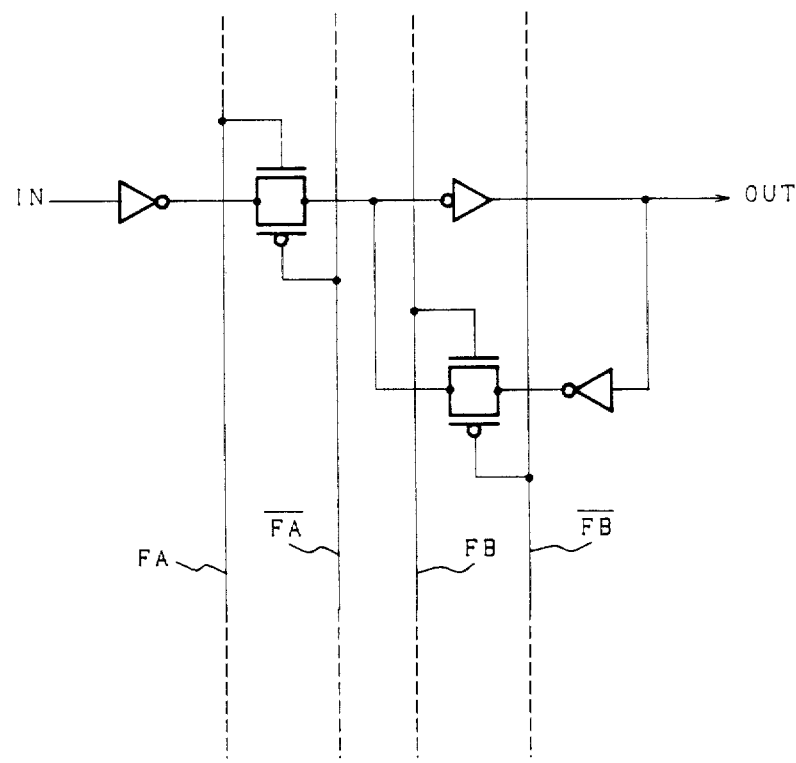
FIGS. 8 and 9 are circuit diagrams showing the other configuration examples of the logic circuit configuration for one bit of a static type data latch circuit.
Figure 9:
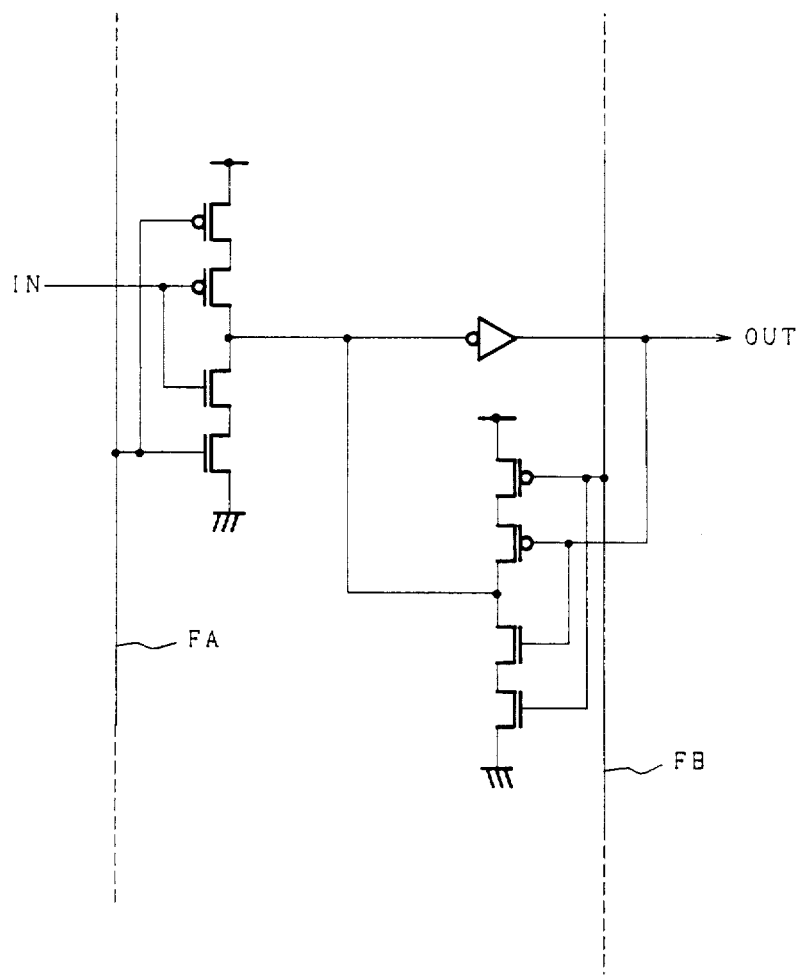
Figure 10:
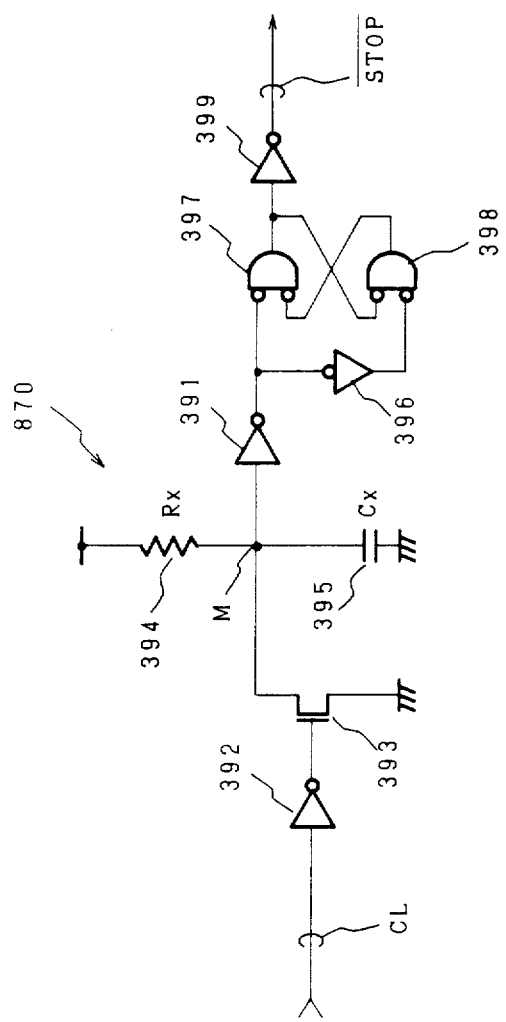
FIG. 10 is a circuit diagram showing a configuration example intended to stabilize the output signal of the data stagnation detection circuit.

Also, static type data latch circuits can employ such configurations as shown in FIGS. 8 and 9. That is, the configuration shown in FIG. 5 is ever known as FIG. 3.10 on page 71 in "Introduction to VLSI system" by Carver Mead and Lynn Conway, and the configuration shown in FIG. 6 is disclosed in Japanese Pat. Appln. Laid Open No. 50-34434 (1975).

In addition, in order to stabilize the potential level of the output signal $\overline{STOP}$ from the data stagnation detection circuit 870, such a configuration can be employed that an R-S flip-flop consisting of NAND gates 397 and 398 and an inverter 396 is added to the output side of the inverter 391. In this case, an inverter 399 for inverting the output from the R-S flip-flop to obtain negative logic is required on the output side.

Figure 11:
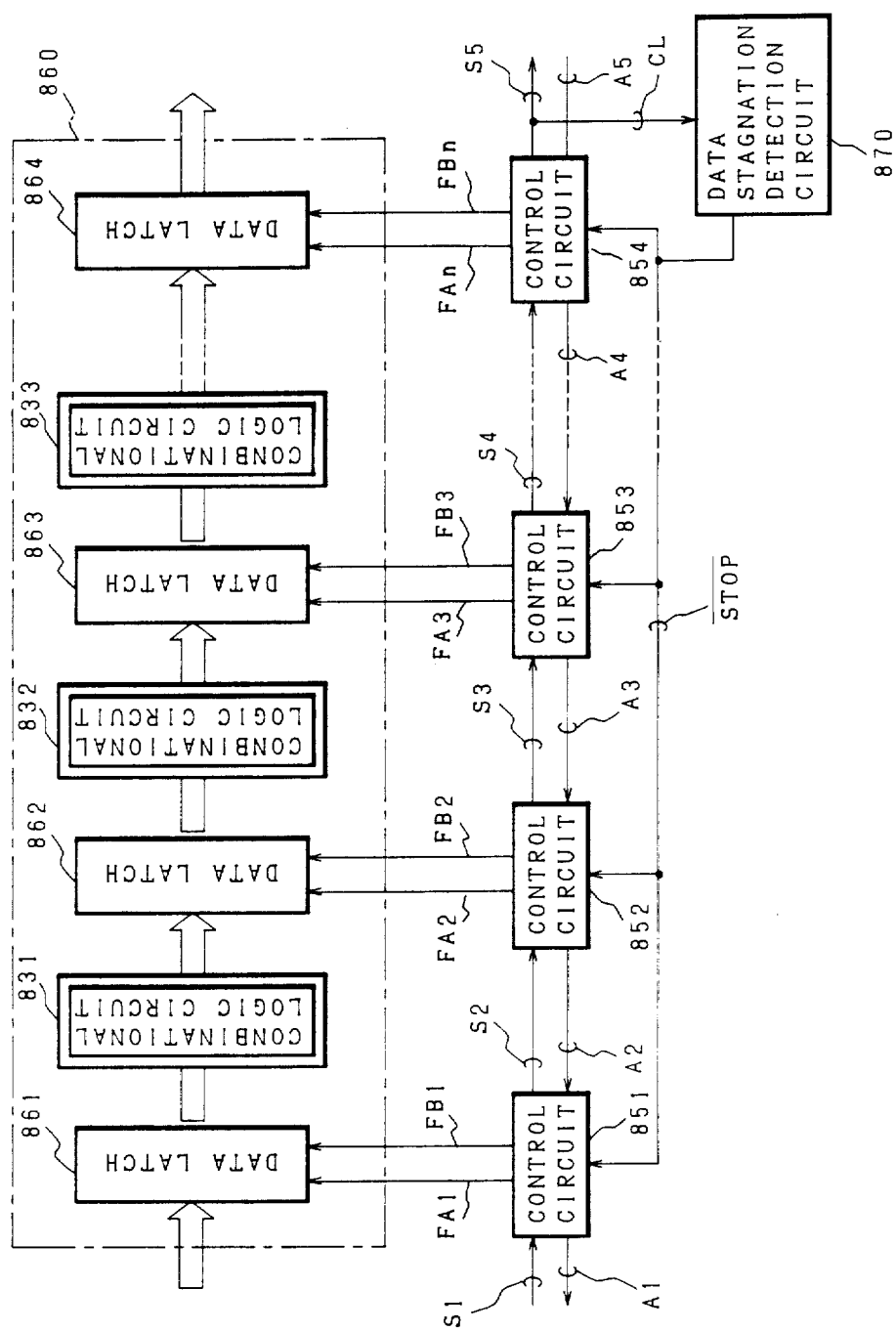
FIG. 11 is a block diagram showing the schematic configuration of a pipeline processing apparatus according to this invention.

Now, although the above description is made with respect to data transfer apparatus, it is needless to say that a pipeline processing using the data tranfer apparatus of this invention can be configured by providing combinational logic circuits 831, 832 and 833 between the static type parallel data latches 861 through 864 in FIG. 4 respectively, as shown in FIG. 11.

As described above in detail, the data transfer apparatus and pipeline processing apparatus according to this invention, when data is satisfactorily transferred without data stagnation on the data transfer path, can be operated as a dynamic type data latch circuit by fixing the transfer gate on the feedback side of each static type data latch circuit at non-active state. This causes the current consumption to be substantially reduced, together with calorific value decreased. In addition, the larger a data width is the more such effect of this invention is exhibited.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data transfer apparatus comprising:
   a data transfer path comprising a cascade connection of a plurality of static type parallel data latch circuits, each data latch circuit including an output, and a feedback stage for positively latching data at said output when enabled by an assertion of a data latch control signal;
   a plurality of data transfer control circuits corresponding to said plurality of data latch circuits, a particular one independently asserting and negating said data latch control signal of a particular corresponding data latch circuit in response to data transfer control signals received from a previous and a subsequent data transfer control circuit;
   a data stagnation detection circuit, coupled to said particular and said subsequent data transfer control circuits, for detecting a data stagnation and asserting a stop signal if said data stagnation is detected, otherwise, negating said stop signal if said data stagnation is not detected; and
   means, coupled to said particular data transfer control circuit and responsive to said stop signal, for inhibiting said data latch control signal from being asserted if said stop signal is negated.

2. The data transfer apparatus of claim 1 wherein said data stagnation circuit comprises a timing circuit for detecting said data stagnation if a particular one of said data transfer signals for said subsequent data transfer control circuit has a prespecified state exceeding a predetermined time duration.

3. The data transfer apparatus of claim 1 wherein said data stagnation circuit comprises a combinatorial logic circuit for detecting said data stagnation if a particular one of said data transfer signals of said previous, particular one and subsequent data transfer control circuits all have a prespecified state.

4. A pipeline processing apparatus comprising:
   a data transfer path comprising a cascade connection of a plurality of static type parallel data latch circuits, each data latch circuit including an output and a feedback stage for positively latching data at said output when enabled by an assertion of a data latch control signal;
   a plurality of logic circuits, one of which is disposed between said cascade connected data latch circuits for executing predetermined processing for data inputted to a particular data latch from a previous data latch circuit in and thereafter outputting the processed data to a next data latch circuit;
   a plurality of data transfer control circuits, one corresponding to one of said plurality of data latch circuits of said data transfer path, a particular one for independently asserting and negating said data latch control signal of a particular corresponding data latch circuit in response to data transfer control signals received from a previous and a subsequent data transfer control circuit;
   a data stagnation detection circuit, coupled to said particular and said subsequent data transfer control circuits, for detecting a data stagnation and asserting a stop signal if said data stagnation is detected, otherwise, said detection circuit negating said stop signal; and
   means, coupled to said particular data transfer control circuit and responsive to said stop signal, for inhibiting said data latch control signal from being asserted if said stop signal is negated.

5. The data transfer apparatus of claim 4 wherein said data stagnation circuit comprises a timing circuit for detecting said data stagnation if a particular one of said data transfer signals for said subsequent data transfer control circuit has a prespecified state exceeding a predetermined time duration.

6. The data transfer apparatus of claim 4 wherein said data stagnation circuit comprises a combinatorial logic circuit for detecting said data stagnation if a particular one of said data transfer signals of said previous, particular one and subsequent data transfer control circuits all have a prespecified state.

7. A data transfer apparatus comprising:
   a static type data latch circuit having an output and a feedback stage for positively latching data at said output in response to an assertion of a data latch control signal;
   a data transfer control circuit coupled to said latch circuit for controlling said latch control signal; and a data stagnation detection circuit, coupled to said control circuit, for inhibiting assertion of said latch control signal if a data stagnation is not detected.

8. The data transfer apparatus of claim 7 further comprising:
a second static type data latch circuit cascade connected to said first static type data latch circuit, said second data latch circuit having an output and a feedback stage for positively latching data at said output of said second data latch circuit in response to an assertion of a second data latch control signal; and
a second data transfer control circuit coupled to said second latch circuit for controlling said second latch control signal;
wherein,
said data stagnation detection circuit is coupled to said first and second data transfer control circuits and inhibits assertion of said first and second latch control signals if a data stagnation is not detected.

9. The data transfer apparatus of claim 8 wherein said first and second data transfer control circuits assert and negate respective data latch control signals in response to data transfer control signals; and
said data stagnation is detected if preselected data transfer control signals of said first and second data transfer control signals become predetermined values.

10. A data transfer apparatus comprising:
a datapath including a series of static data latch circuits, each data latch circuit including an output, and a feedback stage for positively latching data at said output when enabled by an assertion of a data latch control signal;
a series of data transfer control circuits corresponding to said series of static data latch circuits, a particular transfer control circuit independently controlling said data latch control signal of said corresponding data latch circuit in response to data transfer control signals received from a previous and a subsequent data transfer control circuit; and
a data stagnation detection circuit for detecting a data stagnation in said datapath and only enabling assertion of said data latch control signal by said particular data transfer control circuit if said data stagnation is detected.

11. The data transfer apparatus of claim 10 wherein said data stagnation circuit comprises a timing circuit for detecting said data stagnation if a particular one of said data transfer signals for said subsequent data transfer control circuit has a prespecified state exceeding a predetermined time duration.

12. The data transfer apparatus of claim 10 wherein said data stagnation circuit comprises a combinatorial logic circuit for detecting said data stagnation if a particular one of said data transfer signals of said previous, particular one and subsequent data transfer control circuits all have a prespecified state.

13. The data transfer apparatus of claim 10 wherein said data stagnation detection circuit detects said data stagnation if preselected transfer control signals of two sequential data transfer control circuits have predetermined values.

* * * * *